Dec. 17, 1929.  R. S. CROSBY  1,739,712
MACHINE FOR APPLYING NUTS TO SCREWS, BOLTS, AND STUDS
Filed Dec. 1, 1927   2 Sheets-Sheet 1
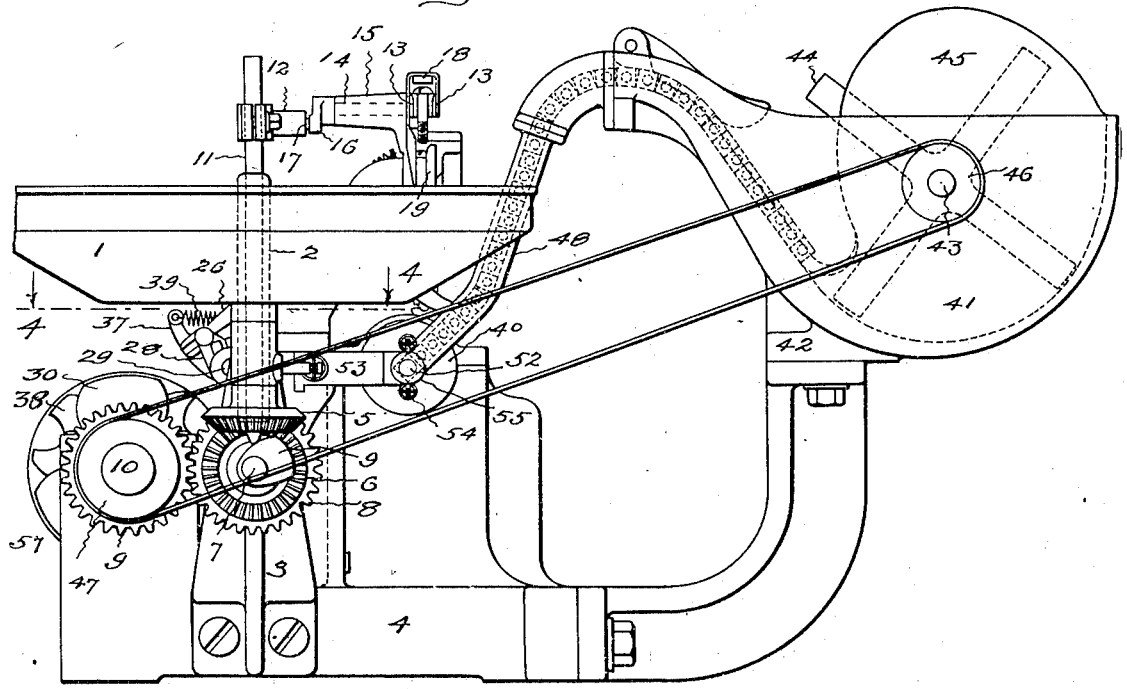
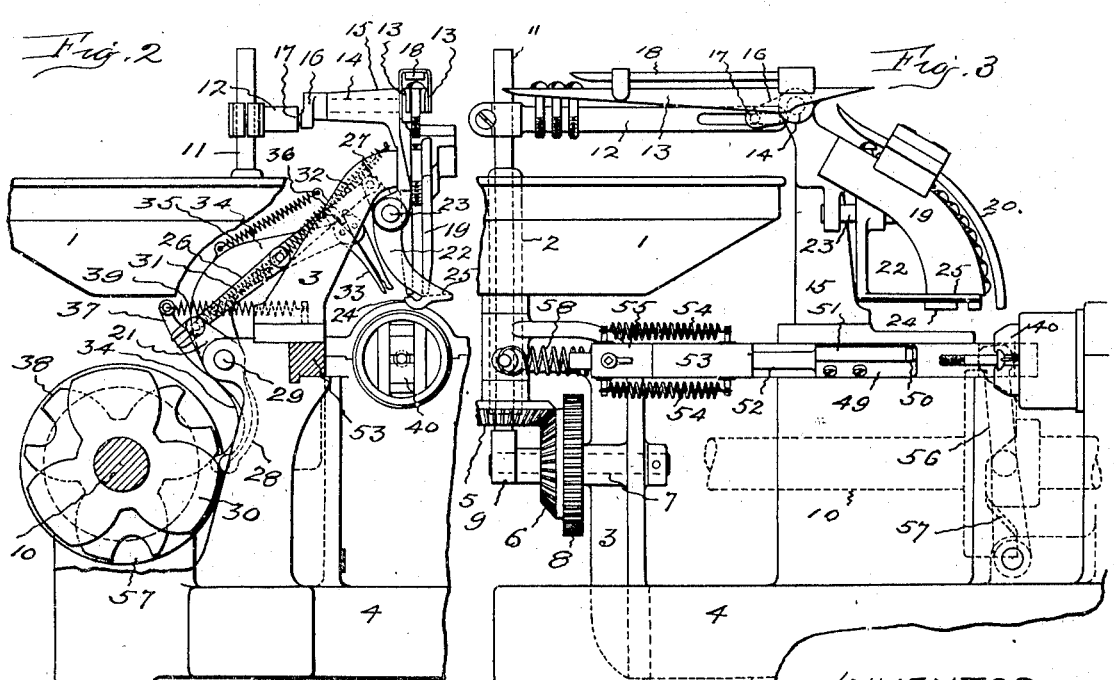
INVENTOR
Reuben S. Crosby
Harry R. Williams
Atty.

Dec. 17, 1929.     R. S. CROSBY     1,739,712
MACHINE FOR APPLYING NUTS TO SCREWS, BOLTS, AND STUDS
Filed Dec. 1, 1927     2 Sheets-Sheet 2
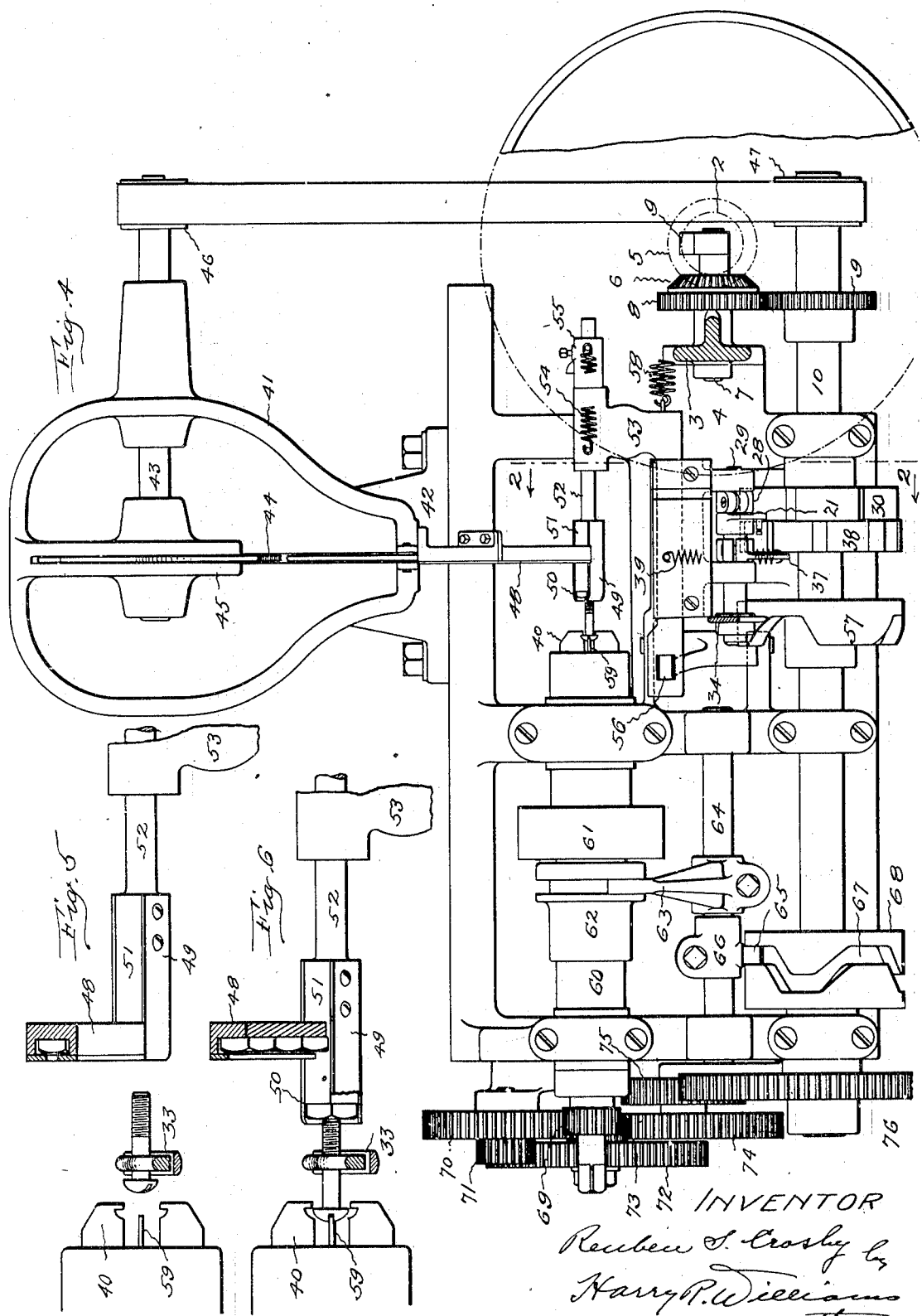
INVENTOR
Reuben S. Crosby
Harry P. Williams
atty.

Patented Dec. 17, 1929

1,739,712

UNITED STATES PATENT OFFICE

REUBEN S. CROSBY, OF HARTFORD, CONNECTICUT, ASSIGNOR TO THE ASA S. COOK COMPANY, OF HARTFORD, CONNECTICUT, A CORPORATION OF CONNECTICUT

MACHINE FOR APPLYING NUTS TO SCREWS, BOLTS, AND STUDS

Application filed December 1, 1927. Serial No. 237,025.

This invention relates to a machine for turning nuts onto screws, and bolts, and studs. The term "screws" hereinafter used in this specification is to be understood to include not only screws, bolts, screw studs but the like articles.

The object of the invention is to provide a simple machine which will automatically take screws from a promiscuous mass in a hopper and nuts from a promiscuous mass in another hopper and feed them together in such manner that the nuts will be quickly turned upon the ends of the screws and the product discharged.

In the machine illustrated as embodying the invention, slotted and threaded screws are picked up from a hopper by oscillatory fingers and passed into a curved runway down which they slide first hanging by their heads and then turning to a horizontal position. At the lower end of the runway the screws are, one at a time, grasped by oscillatory fingers and carried into line with a rapidly rotating opened chuck. The threaded nuts are pushed out from a hopper into a chute down which they slide to a reciprocatory carrier which, one at a time, presses them into engagement with the threaded ends of the screws and pushes the screw heads into the chuck which then closes. When the chuck is closed the screw rotates therewith and turns into the nut, the engaging threads drawing the nut out of the carrier until the nut is screwed the desired distance upon the screw, at which time the carrier is withdrawn, the chuck is opened and the screw with the nut ejected by the thrust of a spring pressed plunger that rotates with the chuck spindle and engages the end of the screw. The cycle of actions is repeated and continues as long as there are screws and nuts in the hoppers.

In the accompanying drawings Fig. 1 shows an elevation looking toward one end of a machine designed to turn nuts onto screws, which embodies the invention. Fig. 2 is an elevation of the same end with parts cut away on the plane indicated by the dotted line 2—2 on Fig. 4. Fig. 3 is a front elevation of the end of the machine shown in Fig. 2. Fig. 4 is a top view of the machine with the screw hopper removed and portions cut in horizontal section on the plan indicated by the dotted line 4—4 on Fig. 1. Fig. 5 is a detail showing the relations of the screw holding chuck and the nut carrier, with the chuck open to receive a screw head and the holder in position to receive a nut. Fig. 6 is a similar view with the parts in the positions occupied when the screw is about to be gripped by the chuck and the nut is about to be turned upon the screw.

The screw hopper 1 is rotatable, being fastened to the upper end of a tubular shaft 2 which extends through and turns in the upper end of a bracket 3 that is secured to the frame 4 and that supports the hopper. (Figs. 1, 3.) Attached to the lower end of this shaft is a bevel gear 5 engaged with which is a bevel gear 6 fastened to an arbor 7 that turns in a bearing in the bracket. Secured to the arbor is a spur gear 8 that meshes with the spur gear 9 which is fastened to the cam shaft 10. (Fig. 4.)

Extending through the tubular shaft 2 is a rod 11, fastened to which, above the hopper, is a radially extending arm 12 that has a slot in its outer end. (Fig. 3.) Rotatable with the arbor 7 and gears 6 and 8 is a cam 9 that engages the lower end of the rod 11 and causes the rod to reciprocate vertically and the arm 12 to move up and down as the hopper rotates. (Figs. 1, 3.)

A pair of spaced fingers 13 that extend over the screw hopper, are fastened to one end of an arbor 14 supported in the upper end of the bracket 15 which is fastened to the top of the frame. (Fig. 3.) Attached to the other end of the arbor 14 is a rocker arm 16 that has a stud 17 which projects into the slot in the end of the arm 12. (Figs. 2, 3.) By means of this connection as the hopper is rotated and the arm 12 moves up and down, the fingers 13 are oscillated so that their inner ends slip down into the hopper at one angle and then swing up and incline in an opposite direction. With the inner ends of the fingers projecting down into the hopper screws are pushed into the space between them from the mass of screws that rotates with the hopper. When the inner ends of the fingers are raised the screws which are picked up slide down between the fingers hanging by their heads. A guard 18 is arranged over the space between the fingers to prevent the screws from falling out. (Fig. 3.)

Adjacent to the outer ends of the oscillatory screw picking fingers is a runway formed by plates 19 fastened to the bracket 15. When the fingers are raised the screws which they have picked up slide down from the fingers into this runway which is curved so that when the screws enter they hang by their heads substantially vertical, but as they pass down they turn and lie in a horizontal position at the lower end of the runway. Over the top of the runway is a guard 20. (Fig. 3.)

Movable under the bottom of the runway is a gate on the lower end of a rocker arm 22 that is fastened to an arbor 23 supported in bearings in the bracket 3. This gate has a curved recess 24 adapted to receive the screw shanks and a flat section 25 which closes the lower end of the runway when the recessed part is swung away with a screw. (Fig. 2.) A link 26 connects a rocker arm 27 fastened to the arbor 23, with a rocker arm 21 which is connected to the upper end of a lever 28 that is pivoted on an arbor 29 supported in the frame, and is adapted to be oscillated by a cam 30 on the cam shaft. The lever 28 is yieldingly held in engagement with the lower end of the link 26 by a spring 31, and a stiffer spring 32 is arranged between the bracket and the link to normally keep the end of the lever in engagement with the cam 30. (Fig. 2.) By this means at the proper time the rocker arm 22 is oscillated to carry a screw to one side of the lower end of the runway and when this is being accomplished the flat section of the gate closes the runway to prevent the other screws from dropping from the runway.

When the gate swings over it carries a screw into position to be grasped by a pair of fingers 33. These fingers are pivoted on the upper end of a lever 34 and are normally held closed by a spring 35 which is connected with a finger 36 that is pivoted to one of the fingers 33 and bears against the other finger. (Fig. 2.) The lever 34 is fastened to the arbor 29 and is held in engagement with a cam 38 on the cam shaft by a spring 39 fastened between the bracket 3 and a finger 37 clamped to the arbor. (Fig. 2.) This cam oscillates the lever 34 so that the fingers 33 swing down and pick up a screw from the gate and then carry the screw into axial alignment with the chuck 40, which position is illustrated in Figs. 5 and 6.

The nut hopper 41 is mounted on a bracket 42 attached to the front of the frame. Turning in bearings in the walls of this hopper is a shaft 43 that carries radially projecting arms 44 which move between the partition walls 45 in the interior of the hopper. On the outer end of this shaft is a pulley 46 that is belted to a pulley 47 on the cam shaft. When the shaft is rotated the arms 44 turning through the mass of nuts in the hopper push some of the nuts up the side wall of the hopper and over into the chute 48 down which they slide. (Figs 1, 4.)

Movable across the lower end of the nut chute and in line with the chuck is the nut carrier 49 which has an opening 50 in the front end shaped to receive a nut from the chute, and has a flat surface 51 that closes the lower end of the chute when a nut is carried forward. (Figs. 5, 6.) The carrier has a shank 52 which is movably fitted in a slide 53 and is normally pulled forward by a pair of springs 54 connected between the slide and a collar 55 attached to the shank. (Figs. 3, 4.) The slide has a longitudinal movement in a way in the frame and is moved forward at the proper times by a lever 56 and cam 57, and is retracted by a spring 58. (Figs. 3, 4.) By this means the carrier is retracted and after receiving a nut from the end of the chute it carries that nut forward into engagement with the threaded end of the screw which has been brought into line with the chuck by the fingers 33, as previously described. The continued forward movement of the carrier causes the nut to push the screw until its head is between the jaws of the chuck 40, as illustrated in Fig. 6. At this moment the chuck jaws are closed over the head of the screw and with the chuck plunger 59 in the slot of the screw, the screw is turned into the nut. The forward movement of the nut carrier having at this time ceased, the engagement of the threads causes the nut to be drawn forward from the carrier onto the screw the desired distance and then the chuck jaws open and the screw with its nut is ejected.

The chuck and its operating means may be any common type, well known to those skilled in the screw machine art, consequently it is not illustrated in detail. It is sufficient to mention that the chuck is carried as usual by a spindle 60 which is provided with a driving pulley 61. The chuck is opened and closed in the ordinary way by the movements of the collar 62 which is effected by the arm 63 attached to the shaft 64 that is reciprocated by the stud 65 which projects from the collar 66 fastened to the shaft, into the cam groove 67 of the cam disk 68 on the cam shaft. (Fig. 4.)

On the end of the chuck spindle, which is rotated by the driving pulley, is a pinion 69 which is engaged by a gear 70 attached to which is a pinion 71. Engaging with this pinion is a gear 72 which has a pinion 73 that engages with a gear 74 connected with which is a pinion 75 that meshes with a gear 76 fastened on the cam shaft. (Fig. 4.) Each of the cams on the cam shaft is so shaped that it performs three similar actions during each revolution of the cam shaft, that is, during each revolution of the cam shaft three screws are carried into line with the chuck and three nuts are applied to the screws. As a result of this design the output of the machine is high without requiring the machine to be run at excessive speed, or in other words with a predetermined speed of rotation of the chuck spindle, the gearing is such and the cams are so shaped that three nuts are applied to three screws at one-third of the speed of rotation of the cam shaft that would be necessary if the cams were so designed that at each revolution but one nut was applied to a screw, which not only allows a relatively slow cam shaft speed but a similarly low spindle speed for the output.

With single cams, instead of the triple cams and the continuously rotating chuck spindle which are features of this invention, to obtain the same volume of product the high speed of the cam shaft that is necessary gives the elements, particularly the gate and fingers, such quick actions that the screws snap out of place and the nuts fail to properly engage with the screws, to say nothing of the excess wear on the parts resulting from the high speeds. Time is also saved by reason of the fact that the chuck spindle always rotates and the other elements have no dwell or lost motions.

The invention claimed is:—

1. A machine for turning nuts upon screws comprising a chuck, means for rotating and opening and closing the chuck, a screw hopper, a runway arranged to receive screws from the screw hopper, a gate at the lower end of the runway adapted to carry the screws one at a time to one side of the runway, picker fingers adapted to grasp a screw from the gate and carry it into line with the chuck, a nut hopper, a chute extending from the nut hopper and arranged to receive nuts from the nut hopper, a carrier at the lower end of said chute adapted to receive a nut and push it against the screw held by said picker fingers until the head of the screw enters the chuck, a cam shaft, cams on the cam shaft timed to actuate the gate, picker fingers, carrier and chuck opening and closing means a plurality of times for each rotation of the cam shaft, and means for rotating the cam shaft.

2. A machine for turning nuts upon screws comprising a chuck, means for rotating and opening and closing the chuck, a screw hopper, a runway arranged to receive screws from the screw hopper, a gate at the lower end of the runway adapted to carry the screws one at a time to one side of the runway, picker fingers adapted to grasp a screw from the gate and carry it into line with the chuck, a nut hopper, a chute extending from the nut hopper and arranged to receive nuts from the nut hopper, a carrier at the lower end of said chute adapted to receive a nut and push it against the screw held by said picker fingers until the head of the screw enters the chuck, a cam shaft, cams on the cam shaft timed to actuate the gate, picker fingers, carrier and chuck opening and closing means a plurality of times for each rotation of the cam shaft, and reduction gearing connecting the chuck rotating means and the cam shaft.

3. A machine for turning nuts upon screws comprising a chuck, means for rotating and opening and closing the chuck, a screw hopper, mechanisms for feeding screws from the screw hopper into line with the chuck, a nut hopper, mechanisms for feeding nuts from the nut hopper into line with the chuck, and means causing them to push the heads of the screws into the chuck, a cam shaft, and cams on the cam shaft timed to actuate the chuck opening and closing mechanism, the screw feeding and the nut feeding mechanisms a plurality of times for each rotation of the cam shaft.

4. In a machine for handling screws in combination, a chuck, means for rotating and opening and closing the chuck, a screw receiving hopper, a runway arranged to receive screws from said hopper, a gate at the lower end of the runway adapted to carry the screws one at a time from the runway to one side thereof, picker fingers adapted to pick up a screw from the gate and carry it down into line with the chuck, a cam shaft, cams on the cam shaft timed to actuate the gate, picker fingers and the chuck opening and closing means a plurality of times for each rotation of the cam shaft, and means for rotating the cam shaft.

REUBEN S. CROSBY.